United States Patent
Gehres et al.

(10) Patent No.: US 10,882,356 B2
(45) Date of Patent: Jan. 5, 2021

(54) TIRE WITH BELT HAVING WRAP AROUND GUM STRIP

(71) Applicant: Bridgestone Americas Tire Operations, LLC, Nashville, TN (US)

(72) Inventors: Justin M. Gehres, Uniontown, OH (US); Adam K. Nesbitt, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 121 days.

(21) Appl. No.: 15/189,642

(22) PCT Filed: Dec. 16, 2014

(86) PCT No.: PCT/US2014/070442
§ 371 (c)(1),
(2) Date: Jun. 22, 2016

(87) PCT Pub. No.: WO2015/100052
PCT Pub. Date: Jul. 2, 2015

(65) Prior Publication Data
US 2017/0151837 A1 Jun. 1, 2017

Related U.S. Application Data

(60) Provisional application No. 61/920,533, filed on Dec. 24, 2013.

(51) Int. Cl.
*B60C 9/00* (2006.01)
*B60C 9/18* (2006.01)
(Continued)

(52) U.S. Cl.
CPC .......... *B60C 9/1835* (2013.01); *B60C 9/2009* (2013.01); *B60C 9/22* (2013.01); *B60C 2009/1864* (2013.01)

(58) Field of Classification Search
CPC ................ B60C 9/1835; B60C 9/2009; B60C 2009/0223; B60C 9/00; B60C 15/0635;
(Continued)

(56) References Cited

U.S. PATENT DOCUMENTS 3,598,165 A  8/1971 Hanus
3,739,828 A * 6/1973 Schaevitz ........... B60C 11/0309
152/209.12
(Continued)

FOREIGN PATENT DOCUMENTS

CN    1080895    1/1994
EP    0106788    4/1984
(Continued)

OTHER PUBLICATIONS

English machine translation of Ietomo (JP 2008265430 A) (Year: 2008).*

(Continued)

*Primary Examiner* — Leith S Shafi
*Assistant Examiner* — Nicholas R Krasnow
(74) *Attorney, Agent, or Firm* — Shaun J. Fox; Bryan J. Jaketic

(57) ABSTRACT

A tire includes a circumferential tread, a pair of beads, and a pair of sidewalls. The tire further includes a plurality of circumferential belts disposed below the circumferential tread and extending in an axial direction. The plurality of circumferential belts include a lower belt and an upper belt. The tire also includes at least one gum strip. The at least one gum strip has a first portion in contact with a top surface of the lower belt and a bottom surface of the upper belt. The at least one gum strip has a second portion disposed below the lower belt.

7 Claims, 3 Drawing Sheets

(51) Int. Cl.
B60C 9/22 (2006.01)
B60C 9/20 (2006.01)

(58) Field of Classification Search
CPC ............ B60C 2015/0625; B60C 15/06; B60C 11/0075; B60C 11/0058; B60C 11/005; B60C 11/0041; B60C 2009/207; B60C 2009/1878; B60C 2009/1871; B60C 9/18
See application file for complete search history.

(56) References Cited

U.S. PATENT DOCUMENTS

| | | |
|---|---|---|
| 3,799,233 A | 3/1974 | Cappa |
| 3,902,542 A | 9/1975 | Imamura et al. |
| 3,913,652 A | 10/1975 | Imamura et al. |
| 3,945,421 A | 3/1976 | Poque et al. |
| 4,062,393 A | 12/1977 | Bertrand |
| 4,142,568 A | 3/1979 | Kleijwegt |
| 4,183,389 A | 1/1980 | Grosch |
| 4,184,530 A * | 1/1980 | Mirtain ................ B60C 9/2009 152/527 |
| 4,273,177 A | 6/1981 | Nybakken |
| 4,941,523 A | 7/1990 | Galante et al. |
| 4,957,151 A | 9/1990 | Takehara |
| 5,014,762 A | 5/1991 | Beer et al. |
| 5,261,474 A | 11/1993 | Lobb et al. |
| 5,335,707 A | 8/1994 | Sano et al. |
| 5,342,473 A | 8/1994 | Bibona et al. |
| 5,435,369 A | 7/1995 | Yap et al. |
| 5,458,173 A | 10/1995 | Yamashita |
| 5,503,205 A | 4/1996 | Aoki et al. |
| 5,605,589 A | 2/1997 | Johanning et al. |
| 5,616,195 A | 4/1997 | Marquet et al. |
| 5,674,331 A | 10/1997 | Saeki et al. |
| 5,743,975 A | 4/1998 | Sinopoli et al. |
| 5,779,828 A | 7/1998 | Okamoto |
| 5,830,295 A * | 11/1998 | Hobbs ................ B60C 9/2009 152/526 |
| 5,858,137 A | 1/1999 | Assaad et al. |
| 5,879,483 A | 3/1999 | Gerresheim et al. |
| 5,996,662 A | 12/1999 | Cluzel |
| 6,016,859 A | 1/2000 | Okamoto |
| 6,117,258 A | 9/2000 | Spragg et al. |
| 6,209,603 B1 | 4/2001 | Kanenari et al. |
| 6,247,512 B1 | 6/2001 | Radulescu |
| 6,260,593 B1 | 7/2001 | Spragg et al. |
| 6,315,019 B1 | 11/2001 | Garlaschelli et al. |
| 6,401,780 B1 | 6/2002 | Patitsas et al. |
| 6,520,233 B2 | 2/2003 | Torresani |
| 6,536,496 B1 | 3/2003 | Bondu |
| 6,645,334 B1 * | 11/2003 | Smith ................ B29D 30/3007 152/532 |
| 7,243,695 B2 * | 7/2007 | Gervais ................ B60C 9/18 152/532 |
| 7,712,500 B2 | 5/2010 | Hayashi et al. |
| 2002/0179215 A1 | 12/2002 | Farinola |
| 2003/0089441 A1 | 5/2003 | Fischer et al. |
| 2007/0221309 A1 | 9/2007 | Fischer |
| 2010/0282391 A1 * | 11/2010 | Ishiyama ............. B60C 9/2009 152/454 |
| 2011/0186202 A1 | 8/2011 | Harris et al. |
| 2012/0152425 A1 * | 6/2012 | Kawashima ........ B60C 17/0009 152/517 |
| 2012/0222790 A1 * | 9/2012 | Copeland ................ B60C 3/04 152/454 |
| 2013/0292022 A1 * | 11/2013 | Morel-Jean ........... B60C 9/2009 152/451 |
| 2015/0027608 A1 * | 1/2015 | Takahashi ................ B60C 9/30 152/455 |
| 2015/0298511 A1 * | 10/2015 | Kameda .................... B60C 1/00 152/517 |
| 2015/0322248 A1 | 11/2015 | Forte et al. |
| 2016/0031267 A1 * | 2/2016 | Horiuchi ............. B60C 17/0009 152/209.9 |

FOREIGN PATENT DOCUMENTS

| | | |
|---|---|---|
| GB | 1332208 A | 10/1973 |
| JP | 3093812 B2 | 7/2000 |
| JP | 2002079806 | 3/2002 |
| JP | 2002096609 | 4/2002 |
| JP | 2008074250 | 4/2008 |
| JP | 2008265430 | 11/2008 |
| JP | 4234830 B2 | 3/2009 |
| WO | 2014080362 A2 | 5/2014 |
| WO | 2014080362 A3 | 5/2014 |
| WO | 2014080362 A8 | 5/2014 |

OTHER PUBLICATIONS

Imaginecorp <http://www.imaginecorp.com/tire_construction.htm> (Year: 2002).*
Supplementary Search Report; Corresponding EP Application No. EP 14875692 filed Dec. 16, 2014; dated Jun. 20, 2017.
Search Opinion; Corresponding EP Application No. EP 14875692 filed Dec. 16, 2014; dated Jun. 20, 2017.
Machine Translation of JP04-039104: Ikeuchi Takashi, Pneumatic Tire, Japanese Patent Publication, Published Oct. 2, 1992, Japan.
Machine Translation of JP05-124129: Mitsutake Toshiyuki, Manufacture of Pneumatic Tire for Passenger Car, Japanese Patent Publication, Published May 21, 1993, Japan.
English_abstract_of_JP3093812B2.
English_abstract_of_JP4234830B2.
International Preliminary Report on Patentability; Corresponding PCT Application No. PCT/US2014/070442 filed Dec. 16, 2014; dated Jun. 28, 2016.

* cited by examiner

TIRE WITH BELT HAVING WRAP AROUND GUM STRIP

FIELD OF INVENTION

This disclosure relates to the field of tire constructions. More particularly, this disclosure relates to tires having a plurality of belts in a crown region, with an abrasion layer disposed between at least a portion of each belt.

BACKGROUND

Current tire constructions employ body plies having reinforcement cords that extend transversely from bead to bead. Such tires are referred to as radial tires, because the reinforcement cords are in a substantially radial orientation. A radial tire employs at least one inextensible, circumferential belt that contains steel reinforcement cords. The belt is disposed in a crown region of the tire, above the body plies and below the tread. Where multiple belts are used, it is known to employ an abrasion layer between the belt edges.

SUMMARY OF THE INVENTION

In one embodiment, a tire includes a first annular bead, a second annular bead, and a body ply extending between the first annular bead and the second annular bead. The tire also includes a plurality of circumferential belts disposed above the body ply and extending axially across a portion of the body ply. The plurality of circumferential belts includes at least a lower belt and an upper belt disposed above the lower belt. The tire also includes at least one gum strip wrapped around an axial end of the lower belt, such that the at least one gum strip has an upper portion in contact with a top surface of the lower belt and a bottom surface of the upper belt, and such that the at least one gum strip has a lower portion in contact with a bottom surface of the lower belt and a top surface of the body ply. The tire further includes a nylon cap ply disposed above the upper belt, and a circumferential tread disposed above the nylon cap ply and extending axially across the tire. The tire also has a first sidewall extending between the first annular bead and a first shoulder, the first shoulder being associated with the circumferential tread, as well as a second sidewall extending between the second annular bead and a second shoulder, the second shoulder being associated with the circumferential tread.

In another embodiment, a tire includes a carcass ply and a pair of annular beads associated with the carcass ply. The tire also includes a first circumferential belt region, including an upper belt and a lower belt, and a first gum strip wrapped around a first end of the lower belt. The first gum strip has an upper portion that contacts a top surface of the lower belt and a bottom surface of the upper belt. The first gum strip also has a lower portion disposed below the lower belt. The tire further includes a second gum strip wrapped around a second end of the lower belt, wherein the second gum strip has an upper portion that contacts a top surface of the lower belt and a bottom surface of the upper belt. The second gum strip also has a lower portion disposed below the lower belt. The tire also has a circumferential tread and a pair of sidewalls associated with the pair of annular beads and the circumferential tread.

In yet another embodiment, a tire includes a circumferential tread, a pair of beads, and a pair of sidewalls. The tire further includes a plurality of circumferential belts disposed below the circumferential tread and extending in an axial direction. The plurality of circumferential belts include a lower belt and an upper belt. The tire also includes at least one gum strip. The at least one gum strip has a first portion in contact with a top surface of the lower belt and a bottom surface of the upper belt. The at least one gum strip has a second portion disposed below the lower belt.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Radial" and "radially" refer to a direction perpendicular to the axis of rotation of a tire.

"Sidewall" as used herein, refers to that portion of the tire between the tread and the bead.

"Tread" as used herein, refers to that portion of the tire that comes into contact with the road under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

While similar terms used in the following descriptions describe common tire components, it is understood that because the terms carry slightly different connotations, one of ordinary skill in the art would not consider any one of the following terms to be purely interchangeable with another term used to describe a common tire component.

Figure 1:
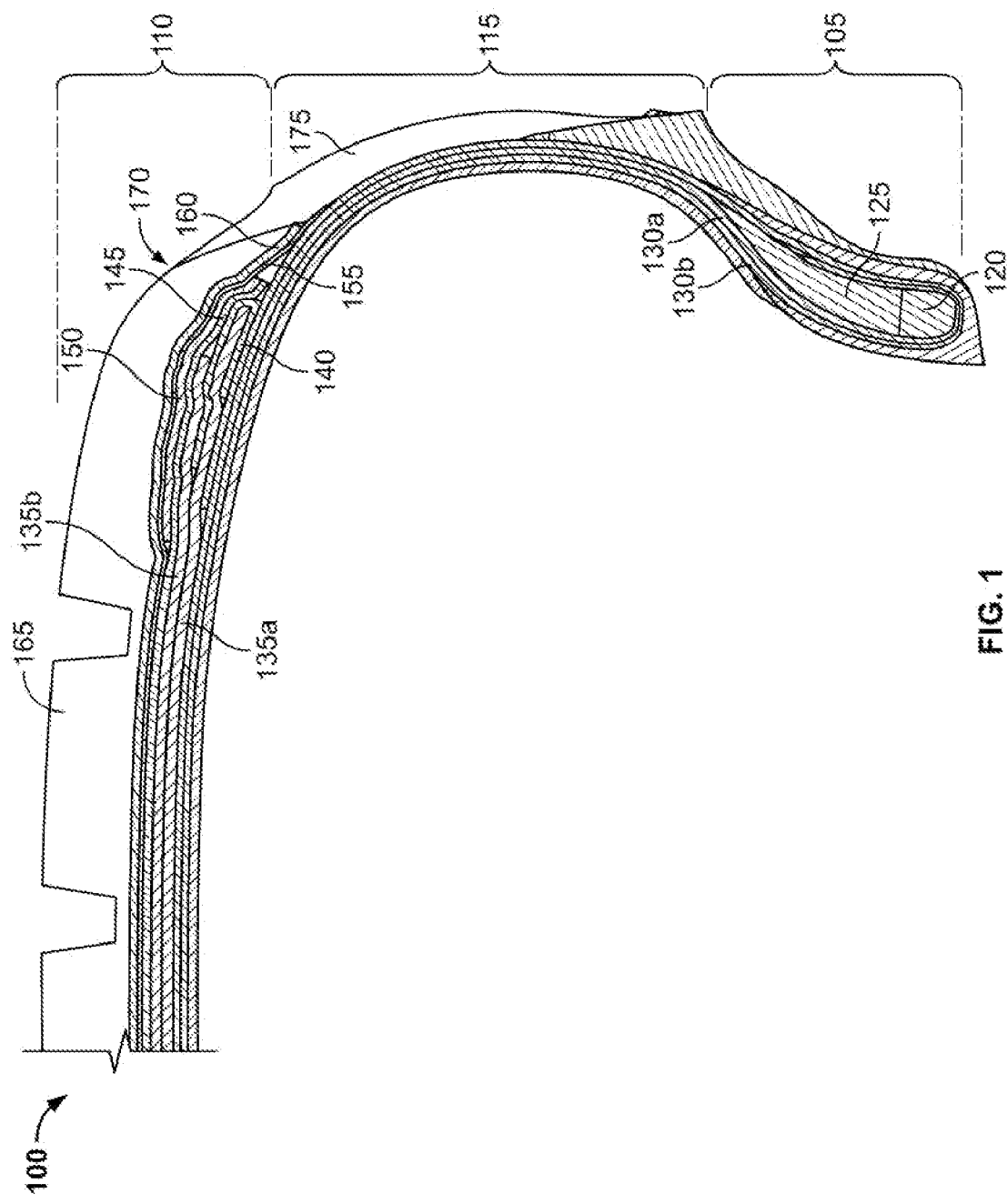
FIG. 1 is a partial cross section of one embodiment of a tire 100 having a pair of belts.

FIG. 1 illustrates a cross section of a quarter section of one embodiment of a tire 100. While only an upper right quadrant of the tire 100 is shown, it should be understood that the other quadrants are substantially the same. In one embodiment, the tire 100 is a passenger car tire. In another embodiment, the tire may be a light truck tire. It should be understood, however, that the tire may a tire for any vehicle, including without limitation, bicycles, motorcycles, all-terrain vehicles, cars, trucks, tractors and other agricultural vehicles, mining vehicles, airplanes, and all other wheeled vehicles.

Figure 2:
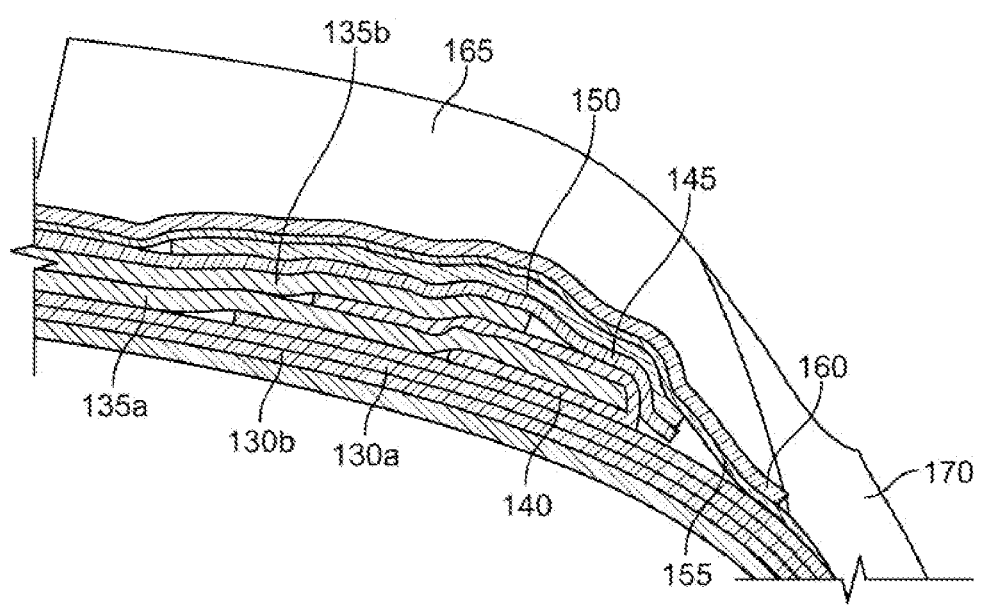
FIG. 2 is a cross section of a shoulder region of the tire 100.

FIG. 2 illustrates a cross section of a shoulder region of the tire 100, and provides greater detail of certain components. Accordingly, tire 100 is described below with reference to both FIGS. 1 and 2.

The tire 100 includes a bead region 105, a crown region 110, and a sidewall region 115 extending from the bead region 105 to the crown region 110. The bead region 105 includes an annular bead 120 and a bead insert 125. It should be understood that a second annular bead (not shown) and second bead filler (not shown) are disposed on the opposite side of the tire. While the bead filler 125 is shown as a single component, it may include multiple regions constructed of different materials. In an alternative embodiment (not shown), the bead filler may be omitted.

A pair of body plies 130a,b extend between the annular bead 120 and the second annular bead (not shown). In the illustrated embodiment, each of the body plies has an inward down ply, and a turn up portion extending outwardly along the annular bead 120 and bead filler 125. A first body ply 130a has a turn up portion that terminates below an apex of the bead filler 125, while a second body ply 130b has a turn up portion that extends through the sidewall region 115 and terminates in the crown region 110 of the tire 100. However, the illustrated body ply arrangement is merely exemplary. In alternative embodiments, any number of body plies in various configurations may be employed.

A pair of circumferential belts, including a lower belt 135a and an upper belt 135b, is disposed above the body plies 130a,b and extends axially across a portion of the body plies 130a,b. In alternative embodiments (not shown), the tire may include three or more circumferential belts.

In one embodiment, each belt 135a,b is essentially rigid and includes an elastomeric belt ply reinforced by cords constructed of steel or other suitable material, including, without limitation, aromatic polyamide, glass fiber, carbon-fiber, or nylon. Within each belt ply, the cords are substantially parallel to each other. The cords of the lower belt 135a are oriented at a first angle with respect to an equatorial plane of the tire, and the cords of the upper belt 135b are oriented at a second angle with respect to the equatorial plane of the tire. The first angle may be different from the second angle. In one embodiment, the cords of the lower belt 135a and the cords of the upper belt 135b are disposed at opposed angles with respect to the equatorial plane of the tire. In exemplary embodiments, the first angle is between 15° and 35° and the second angle is between −15° and −35°. However, it should be understood that any orientation of the belts 135a,b may be employed.

In the illustrated embodiment, the axial width of the lower belt 135a is greater than the axial width of the upper belt 135b. In an alternative embodiment (not shown), both belts have the same width. In another alternative embodiment, the axial width of the upper belt 135b is greater than the axial width of the lower belt 135a.

A gum strip 140 is wrapped around an axial end of the lower belt 135a. In other words, the gum strip 140 is positioned such that an upper portion of the gum strip 140 is in contact with both a top surface of the lower belt 135a and a bottom surface of the upper belt 135b. A lower portion of the gum strip 140 is disposed below the lower belt 135a such that it contacts a bottom surface of the lower belt 135a and a top surface of a body ply 130. In one embodiment, the gum strip 140 is constructed of the same elastomeric material used in the belt plies (i.e., the belt skim).

In the illustrated embodiment, the gum strip 140 is only located in the shoulder region of the tire 100, and does not extend across the axial width of the tire. A second gum strip (not shown) is wrapped around the opposite axial end of the lower belt 135a in the same manner described above. The gum strip 140 and the second gum strip may therefore be described as axially spaced apart. In an alternative embodiment (not shown), a single gum strip may extend across the axial width of the tire and wrap around both ends of the lower belt. In another alternative embodiment (not shown), such as an asymmetric tire, the gum strip is located only on one side of the tire. In such an embodiment, a belt edge insert or a belt wedge may optionally be employed on the opposite side of the tire.

In a method of making the tire 100, the lower portion of the gum strip 140 may bond to both the lower belt 135a and one of the body plies 130 during a curing process. Such bonding may prevent the lower belt 135a from separating from the body plies 130a,b. Additionally, the upper portion of the gum strip 140 may bond to both the lower belt 135a and upper belt 135b during the curing process. Such bonding may prevent the lower belt 135a from separating from the upper belt 135b. The gum strip 140 may also prevent the cords of the lower belt 135a from abrading the upper belt 135b. Likewise, the gum strip 140 may also prevent the cords of the upper belt 135b from abrading the lower belt 135a. Wrapping the ends of the lower belt 135a, without wrapping the top belt 133b, allows for the elimination of belt edge inserts and belt wedges—two components that are known to be employed in tires. Therefore, tire construction may be simplified by wrapping the ends of the lower belt 135a, without wrapping the top belt 133b. This may also result in weight reduction, while maintaining or even improving tire performance.

In one embodiment, the gum strip 140 has gauge of 0.02 inches to 0.06 inches (0.5 mm to 1.5 mm). However, it should be understood that the gum strip may have any desired thickness. The gauge of the gum strip may be selected such that the gum strip prevents abrasion and separation without adding undue weight to the tire.

The tire 100 further includes a cap ply 145 disposed above the upper belt 135b. In one embodiment, the cap ply 145 is constructed of nylon cords. In alternative embodiments, the cap ply may be constructed of polyethylene terephthalate ("PET"), polyethylene naphthalate ("PEN"), aramid fiber, such as KEVLAR, or other polymeric material.

In the illustrated embodiment, the cap ply 145 extends axially across the entire upper belt 135b as well as the entire lower belt 135a. Therefore, each end of the cap ply 145 is disposed outside the respective ends of the lower belt 135*a* and the upper belt 135*b*. In alternative embodiments discussed below, a cap ply of a different relative width may be employed. In another alternative embodiment (not shown), multiple cap plies may be employed. In yet another alternative embodiment (not shown), the cap ply may have gaps along the axial width of the tire.

In one embodiment, the cap ply 145 is formed by continuously winding a cord around the circumference of a tire carcass. In an alternative embodiment, the cap ply 145 is formed by wrapping a sheet around the circumference of the tire carcass.

With continued reference to FIGS. 1 and 2, a reinforcement layer 150 is disposed above a portion of the cap ply 145. In the illustrated embodiment, the reinforcement layer 150 extends axially from an end of the cap ply 145 across only a portion of the cap ply 145. An end of the reinforcement layer 150 is disposed outside the respective end of the upper belt 135*b* and outside the respective end of the lower belt 135*a*.

In one embodiment, a second reinforcement layer (not shown) is disposed above a second end of the cap ply 145. An end of the second reinforcement layer is also disposed outside the respective end of the upper belt 135*b* and outside the respective end of the lower belt 135*a*. The second reinforcement layer extends axially from the second end of the cap ply 145 across only a portion of the cap ply 145, such that the reinforcement layer 150 is axially spaced from the second reinforcement layer.

In an alternative embodiment (not shown), the reinforcement layer may be disposed below the cap ply. In another alternative embodiment (not shown), the reinforcement layer may extend from one end of the cap ply to the other end of the cap ply. In yet another alternative embodiment (not shown), the reinforcement layer may be omitted.

In one embodiment, the reinforcement layer 150 is constructed of nylon. In alternative embodiments (not shown), the reinforcement layer 150 may be constructed of polyethylene terephthalate ("PET"), polyethylene naphthalate ("PEN"), aramid fiber, such as KEVLAR, or other polymeric material. In one particular embodiment, the cap ply 145 and the reinforcement layer 150 are constructed of the same material.

In one embodiment, the reinforcement layer 150 is formed by continuously winding a cord around the circumference of a tire carcass. In one such embodiment, the reinforcement layer 150 and the cap ply 145 may be formed during the same winding process. For example, the cap ply may be formed by a continuous winding process from a first axial side to a second axial side of the tire carcass. After the second axial end of the cap ply is formed, the nylon cord continues to be wound about the second end, towards the first axial side until the reinforcement layer is complete. In an alternative embodiment, the reinforcement layer 150 is formed by wrapping a sheet around the circumference of the tire carcass.

An under-tread layer 155 is disposed above the reinforcement layer 150. The under-tread layer 155 is constructed of rubber and extends axially across the entire crown region such that each end of the under-tread layer 155 is disposed outside the respective ends of the belts 135*a,b*, the cap ply 145, and the reinforcement layer 150. In an alternative embodiment (not shown), the under-tread layer may be omitted.

A sub-tread layer 160 is disposed above the under-tread layer 155. The under sub-tread layer 160 is also constructed of rubber and extends axially across the entire crown region such that each end of the under-tread layer 155 is disposed outside the respective ends of the belts 135*a,b*, the cap ply 145, and the reinforcement layer 150. In an alternative embodiment (not shown), the sub-tread layer may be omitted.

A circumferential tread 165 is disposed in the crown region 110 of the tire 100, above the upper and lower belts 135*a,b*, the gum strip 140, the cap ply 145, the reinforcement layer 150, the under-tread 155, and the sub-tread 160. The circumferential tread 165 extends axially across the tire 100 from a first shoulder 170 to a second shoulder (not shown). The circumferential tread 165 may include tread elements such as grooves, sipes, ribs, blocks, lugs, and other known tread elements. The circumferential tread 165 may be formed of a rubber compound.

A sidewall 175 extends from the bead region 105 through the sidewall region 115 to the first shoulder 170 such that it abuts the circumferential tread 165. A second sidewall (not shown), likewise extends from the second bead region through the sidewall region to the second shoulder on the opposite side of the tire. The sidewalls may be formed of a rubber compound.

Figure 3:
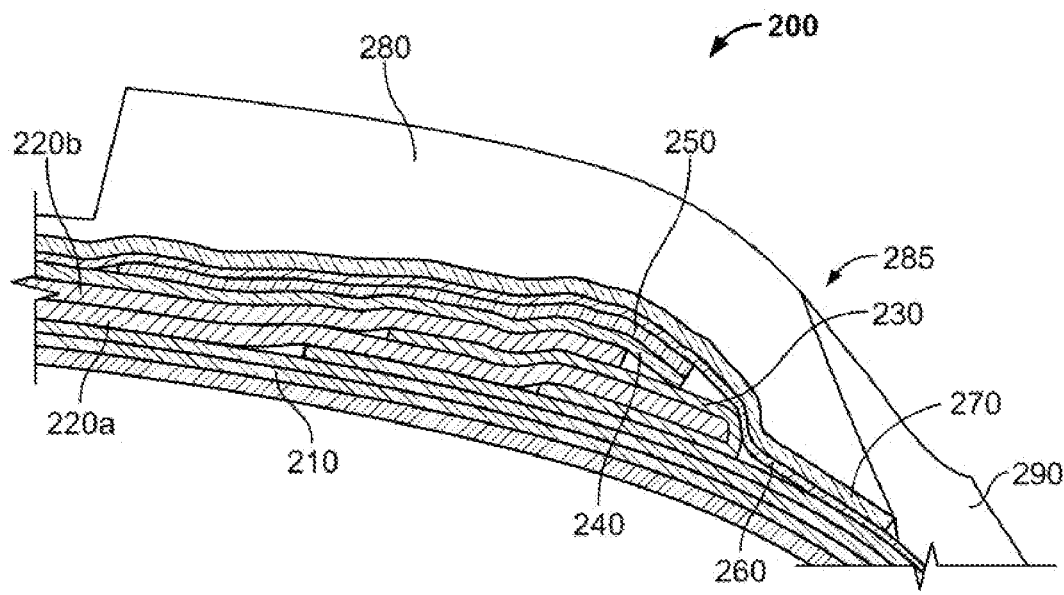
FIG. 3 is a cross section of a shoulder region of an alternative embodiment of a tire having a pair of belts.

FIG. 3 illustrates a cross section of a shoulder region of an alternative embodiment of a tire 200. Although only the shoulder region is shown, it should be understood that the tire 200 is substantially the same as the tire 100 shown in FIGS. 1 and 2, except for the differences discussed below. The components of tire 200 may be constructed in the same manner and from the same materials as the corresponding components of the tire 100 discussed above. The tire 200 may also include the design alternatives discussed above with respect to the tire 100.

The tire 200 includes a body ply 210 extending between a pair of annular beads (not shown). Although only a single body ply is shown, it should be understood that any number of body plies may be employed.

A pair of circumferential belts, including a lower belt 220*a* and an upper belt 220*b*, is disposed above the body ply 210 and extends axially across a portion of the body ply 210. In alternative embodiments (not shown), the tire may include three or more circumferential belts.

A gum strip 230 is wrapped around an axial end of the lower belt 220*a*. In other words, the gum strip 230 is positioned such that an upper portion of the gum strip 230 is in contact with both a top surface of the lower belt 220*a* and a bottom surface of the upper belt 220*b*. A lower portion of the gum strip 230 is disposed below the lower belt 220*a* such that it contacts a bottom surface of the lower belt 220*a* and a top surface of the body ply 210.

In the illustrated embodiment, the gum strip 230 is only located in the shoulder region of the tire 200, and does not extend across the axial width of the tire. A second gum strip (not shown) is wrapped around the opposite axial end of the lower belt 220*a*. The gum strip 230 and the second gum strip may therefore be described as axially spaced apart.

The tire 200 further includes a cap ply 240 disposed above the upper belt 220*b*. In the illustrated embodiment, the cap ply 240 extends axially across the entire upper belt 220*b* and extends onto a portion of the lower belt 220*a*. Each end of the cap ply 240 is disposed outside a respective end of the upper belt 220*b* and inside a respective end of the lower belt 220*a*, such that each end of the cap ply 240 is disposed above the lower belt 220*a*.

A reinforcement layer 250 is disposed above a portion of the cap ply 240. In the illustrated embodiment, the reinforcement layer 250 extends axially from an end of the cap ply 240 across only a portion of the cap ply 240. An end of the reinforcement layer 250 is disposed outside a respective end of the upper belt 220b and inside a respective end of the lower belt 220a, such that the end of the reinforcement layer 250 is disposed above the lower belt 220a.

In one embodiment, a second reinforcement layer (not shown) is disposed above a second end of the cap ply 240. An end of the second reinforcement layer is also disposed outside a respective end of the upper belt 220b and inside a respective end of the lower belt 220a, such that the end of the second reinforcement layer is disposed above the lower belt 220a. The second reinforcement layer extends axially from the second end of the cap ply 240 across only a portion of the cap ply 240, such that the reinforcement layer 250 is axially spaced from the second reinforcement layer.

An under-tread layer 260 is disposed above the reinforcement layer 250. A sub-tread layer 270 is disposed above the under-tread layer 260.

A circumferential tread 280 is disposed in the crown region of the tire 200, above the upper and lower belts 220a,b, the gum strip 230, the cap ply 240, the reinforcement layer 250, the under-tread 260, and the sub-tread 270. The circumferential tread 280 extends axially across the tire 200 from a first shoulder 285 to a second shoulder (not shown). The circumferential tread 280 may include tread elements such as grooves, sipes, ribs, blocks, lugs, and other known tread elements.

A sidewall 290 extends from the bead region of the tire 200 to the first shoulder 285 such that it abuts the circumferential tread 280. A second sidewall (not shown), likewise extends from the bead region to the second shoulder on the opposite side of the tire.

Figure 4:
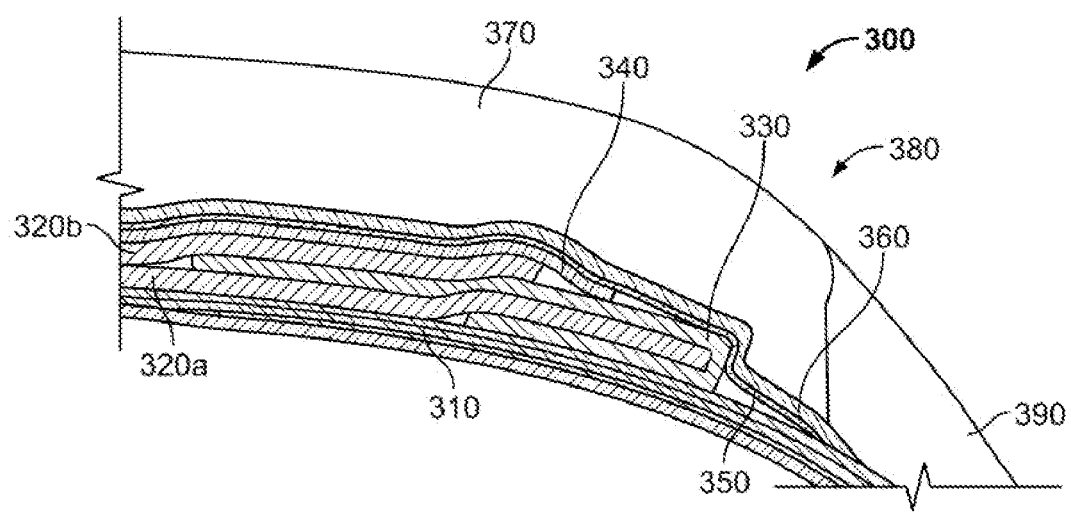
FIG. 4 is a cross section of a shoulder region of another alternative embodiment of a tire having a pair of belts.

FIG. 4 illustrates a cross section of a shoulder region of another alternative embodiment of a tire 300. Although only the shoulder region is shown, it should be understood that the tire 300 is substantially the same as the tire 100 shown in FIGS. 1 and 2, except for the differences discussed below. The components of tire 300 may be constructed in the same manner and from the same materials as the corresponding components of the tire 100 discussed above. The tire 300 may also include the design alternatives discussed above with respect to the tire 100.

The tire 300 includes a body ply 310 extending between a pair of annular beads (not shown). Although only a single body ply is shown, it should be understood that any number of body plies may be employed.

A pair of circumferential belts, including a lower belt 320a and an upper belt 320b, is disposed above the body ply 310 and extends axially across a portion of the body ply 310. In alternative embodiments (not shown), the tire may include three or more circumferential belts.

A gum strip 330 is wrapped around an axial end of the lower belt 320a. In other words, the gum strip 330 is positioned such that an upper portion of the gum strip 330 is in contact with a top surface of the lower belt 320a and a bottom surface of the upper belt 320b. A lower portion of the gum strip 330 is disposed below the lower belt 320a such that it contacts a bottom surface of the lower belt 320a and a top surface of the body ply 310.

In the illustrated embodiment, the gum strip 330 is only located in the shoulder region of the tire 300, and does not extend across the axial width of the tire. A second gum strip (not shown) is wrapped around the opposite axial end of the lower belt 320a. The gum strip 330 and the second gum strip may therefore be described as axially spaced apart.

The tire 300 further includes a cap ply 340 disposed above the upper belt 220b. In the illustrated embodiment, the cap ply 340 extends axially across the entire upper belt 320b and extends onto a portion of the lower belt 320a. Each end of the cap ply 340 is disposed outside a respective end of the upper belt 320b and inside a respective end of the lower belt 320a, such that each end of the cap ply 340 is disposed above the lower belt 320a. In an alternative embodiment (not shown), the cap ply may extend beyond the end of the lower belt, similar to the cap ply 145 of tire 100.

In the illustrated embodiment, the tire 300 does not include a reinforcement layer above the cap ply 340.

An under-tread layer 350 is disposed above the cap ply 340. A sub-tread layer 360 is disposed above the under-tread layer 350.

A circumferential tread 370 is disposed in the crown region of the tire 300, above the upper and lower belts 320a,b, the gum strip 330, the cap ply 340, the under-tread 350, and the sub-tread 360. The circumferential tread 370 extends axially across the tire 300 from a first shoulder 380 to a second shoulder (not shown). The circumferential tread 370 may include tread elements such as grooves, sipes, ribs, blocks, lugs, and other known tread elements.

A sidewall 390 extends from the bead region of the tire 300 to the first shoulder 380 such that it abuts the circumferential tread 370. A second sidewall (not shown), likewise extends from the bead region to the second shoulder on the opposite side of the tire.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A pneumatic tire with a circumferential tread, a pair of beads, and a pair of sidewalls, the pneumatic tire comprising:
   a plurality of circumferential belts disposed below the circumferential tread and extending in an axial direction, the plurality of circumferential belts including a lower belt and an upper belt;
   at least one gum strip wrapped around an end of the lower belt, wherein the at least one gum strip has a first portion in contact with a top surface of the lower belt and a bottom surface of the upper belt, and wherein the at least one gum strip has a second portion disposed below the lower belt, and wherein no gum strip is wrapped around an end of the upper belt;

at least one cap ply disposed above the upper belt, and extending axially across and in contact with the entire upper belt, wherein the at least one cap ply contacts the first portion of the at least one gum strip; and a reinforcement layer disposed above the at least one cap ply and above the at least one gum strip, wherein an end of the reinforcement layer is disposed axially outside a respective end of the upper belt, and wherein the reinforcement layer extends axially across only a portion of the cap ply.

2. The tire of claim 1, wherein the at least one gum strip includes a first gum strip wrapped around a first end of the lower belt and a second gum strip wrapped around a second end of the lower belt.

3. The tire of claim 1, wherein the at least one cap ply has a first end disposed outside a first end of the upper belt and inside a first end of the lower belt.

4. The tire of claim 1, wherein the at least one cap ply has a first end disposed outside a first end of the upper belt and outside a first end of the lower belt.

5. The tire of claim 1, wherein the at least one cap ply contacts a third portion of the at least one gum strip, the third portion being disposed between the first portion and the second portion of the at least one gum strip, wherein the first portion and the second portion of the at least one gum strip extend in substantially axial directions, and wherein the third portion of the at least one gum strip extends in a substantially radial direction.

6. The tire of claim 1, wherein the end of the reinforcement layer is axially outside a respective end of the lower belt, and wherein the end of the reinforcement layer is disposed axially outside the at least one gum strip.

7. The tire of claim 1, further comprising an under-tread disposed above the reinforcement layer.

\* \* \* \* \*